United States Patent [19]

Carter

[11] Patent Number: 5,067,418

[45] Date of Patent: Nov. 26, 1991

[54] RECYCLABLE PAPERBOARD PALLET

[75] Inventor: Leewood C. Carter, Riceville, Tenn.

[73] Assignee: Reusable Rolls, Inc., Riceville, Tenn.

[21] Appl. No.: 557,184

[22] Filed: Jul. 24, 1990

[51] Int. Cl.$^5$ .............................................. B65D 19/12
[52] U.S. Cl. .................................. 108/56.3; 446/127; 108/56.1
[58] Field of Search .................. 108/56.3, 56.1, 51.3, 108/51.1, 57.1; 52/667, 668; 446/127, 107

[56] References Cited

U.S. PATENT DOCUMENTS

| | | | |
|---|---|---|---|
| 2,930,481 | 3/1960 | Bebie | 108/56.3 X |
| 3,036,802 | 5/1962 | Kitchell | 108/56.3 X |
| 3,256,839 | 6/1966 | Peterson et al. | 108/56.1 |
| 3,391,513 | 7/1968 | Jones | 52/667 |
| 3,654,877 | 4/1972 | Barrett | 108/56.1 |
| 3,683,822 | 8/1972 | Roberts et al. | 108/56.3 X |
| 4,760,680 | 8/1988 | Myers | 52/668 X |

*Primary Examiner*—Peter A. Aschenbrenner
*Attorney, Agent, or Firm*—Alan Ruderman

[57] ABSTRACT

A pallet constructed from paperboard has longitudinally extending runners formed from paperboard cores having various configurations and connected to a deck. In the preferred embodiment the cores form runners which are cylindrical members having notches transversely extending through the periphery, and the deck is formed from a number of elongated arcuate segments of cylindrical cores positioned within aligned notches of the various runners. Other notches are formed diametrically remote from the deck members for receiving brace members also formed from elongated arcuate segments of cylindrical core members. The notches in the preferred embodiment have a dovetail configuration with the narrow portion facing outwardly from the cores. The deck members are positioned in the notches with the convex portion of the members facing upwardly, while the brace members are positioned in the respective lower notches with the concave surfaces facing downwardly. A method is disclosed for forming the pallets including cutting of the elongated segments for the deck members and brace members.

9 Claims, 2 Drawing Sheets

RECYCLABLE PAPERBOARD PALLET

BACKGROUND OF THE INVENTION

This invention relates to pallets constructed from paperboard, and more particularly to pallets constructed from paperboard items including cores or tubes which heretofore generally have been considered as waste material.

Large amounts of thick walled paperboard or fiber cores or tubes are used by various industries which thereafter must be disposed of. For example, paper, paperboard, carpet, cloth and plastics are wound about such cores by paper, carpet, clothing and plastic manufacturers respectively, and after removal of these products from the cores, the cores generally are disposed of. The results of a survey reported upon in the October, 1989, issue of "American Paper Maker" indicates that of some 61 printers surveyed in the United States the usage of fiber core per year ranged from 20 to 1,250 tons, and that of these printers some 44 percent disposed of the cores by landfill while 25 percent sell the cores with scrap paper and 25 percent use a waste disposal service. Most (61 percent) of the printers surveyed experienced disposal problems not the least of which is the cost involved in disposing of the fiber cores. The conclusion of the survey was that fiber core disposal is a growing and costly problem among printers. The same can be said of the cores about which carpet is wound.

One of the problems in disposing of heavywall cores or tubes is that generally they are not desirable for recycling into new paperboard because they do not breakdown readily in the pulper due to the size and mass of the cores, e.g., paper cores are typically five feet to eight feet in length, have various outside diameters, four inch, five inch and six inch being very common, and three-eights to three-quarter inch wall thickness. Carpet cores may range in length from eight feet to fifteen feet. With landfills rapidly reaching saturation levels, governmental authorities are mandating the recycling of packaging material. Accordingly, it is imperative that efficient recycling use of these cores or tubes be found.

Although the need for recycling of paperboard materials has been recognized, the known prior art has not proposed the recycling of such material, and especially cores or tubes of the aforesaid type in a manner proposed by the present invention for the construction of pallets. Generally, pallets are constructed of wood which, when they become spent, must either be sent to a landfill or incinerated. Furthermore, wood pallets have nails connecting the members together which, when they become loose can cut or tear fiber and paper products and the like which are supported on the pallets, as well as posing a safety hazard to personnel handling the pallets.

There have been numerous suggestions for the use of paperboard or cardboard for the construction of pallets in the prior art and, in fact, an entire sub-class of the United States Patent & Trademark Office classification is devoted thereto, i.e., Class 108, sub-class 51.3. The most pertinent art known or located during a search of the patented art conducted in preparation to the filing of the present application includes the following U.S. Pat. Nos. 2,643,080 (Vogel); 2,698,696 (Strong); 2,798,685 (Mooney); 4,391,202 (Carter et al); 4,802,421 (Atterby et al); 4,831,938 (Atterby et al); 4,867,074 (Quasnick) and 4,875,419 (Helton et al). Although these patents describe cardboard and paperboard pallets having horizontal arrangements of tubing of various cross sectional configurations, each requires substantially all of such tubing to be specially constructed, that is, recycled tubing or the like was not envisioned. In fact, in all of these patents the proposal is to specially form the runners or longitudinal members, generally by folding and bending of cardboard sheets.

SUMMARY OF THE INVENTION

Consequently, it is a primary object of the present invention to provide a rigid load supporting pallet constructed substantially entirely from spent paperboard materials which had been used previously for other purposes.

It is another object of the present invention to provide a rigid load supporting pallet constructed and assembled entirely from used paperboard or fiber cores or tubes which may be utilized in the same manner as a conventional wooden pallet and with substantially the same load bearing characteristics.

It is a further object of the present invention to provide a rigid load supporting pallet constructed entirely from used paperboard or fiber cores or tubes which may be readily assembled and disassembled, and wherein spent elements of the pallet may be readily replaced without disassembly, the spent elements being more readily broken down in a paper mill pulper than the starting material.

It is a still further object of the present invention to provide a method for constructing rigid load bearing pallets from spent paperboard or fiber cores or tubes of circular cross sectional configuration.

It is a yet still further object of the present invention to provide a pallet constructed from paperboard or fiber cores or tubes interconnected together by segments of paperboard or fiber cores or tubes to provide a rigid load bearing support surface and which can be utilized in the same manner as conventional pallets, the pallet being readily assembled and disassembled.

Accordingly, the present invention provides a pallet constructed from paperboard, the pallet having runners or longitudinally extending members formed from paperboard or fiber cores or tubes or portions thereof having various configurations and being connected to deck or platform members. The terminology fiber cores and paperboard cores or tubes used herein appear merely to be distinguishing terms in the various arts. For example, the paper manufacturing industry apparently uses the terminology fiber core, while the carpet industry merely appears to designate these as paperboard tubes. In either case, for consistency, the terminology paperboard cores will be utilized hereinafter, it being understood that although other materials may be included, the cores are substantially paperboard.

In the preferred form of the invention, the pallets are constructed entirely from paperboard cores which preferably have been previously used and would therefore otherwise be waste material eventually typically disposed of in a landfill. The cores in the preferred embodiment are cylindrical members having a circular cross sectional configuration since cores of other configurations comprise only a minimal amount of the cores initially used by industry. Thus, the runners in the preferred embodiment are formed from such cores by cutting out notches for receiving segments of other cores for forming upper deck members defining the support platform, and cutting out other slots for receiving segments of cores for forming lower base members which provide increased rigidity to the structure. By configuring the various notches and core segments defining the support platform, and also the lower base members, the various members of the pallet may be assembled and tightly secured together by friction without the need for adhesives, and thus may be transported in unassembled form and assembled when needed. This additionally provides the advantage of rapid disassembly for storage in a small space when the pallets are not needed, and permits replacement of spent members of a pallet when the remaining members are still usable.

In the preferred embodiment of the invention, the cores forming the runners may be constructed merely by cutting notches therein while the deck and lower brace members may be longitudinally sliced or cut into segments of the proper size from similar or like core members. Preferably these notcheshave a dovetail configuration so that the arcuate configuration of the segmented cylindrical cores together with the configuration of the notches permit the tight fit to be readily and conveniently made.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENTS

Figure 1:
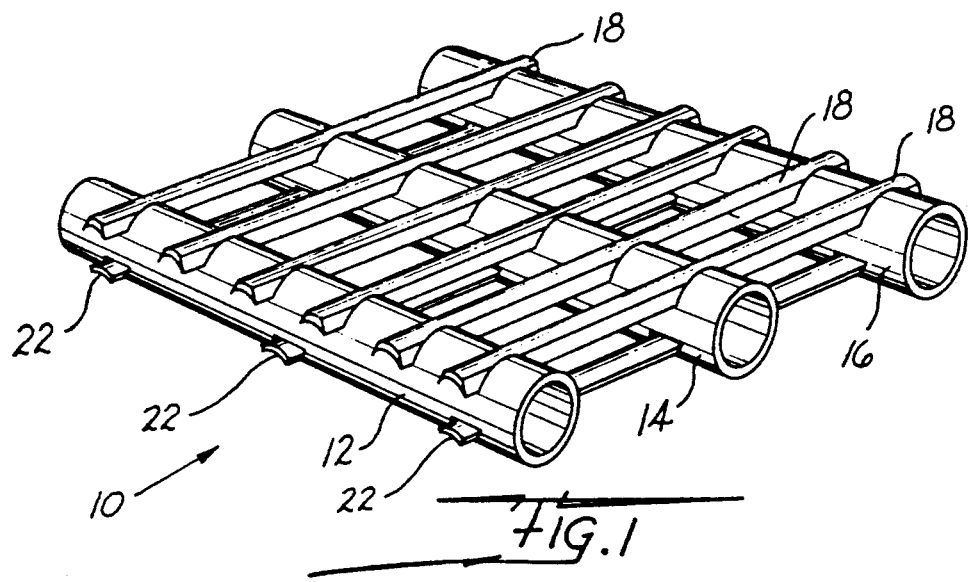
FIG. 1 is a perspective view of the preferred form of a pallet constructed in accordance with the principles of the present invention.
Figure 2:
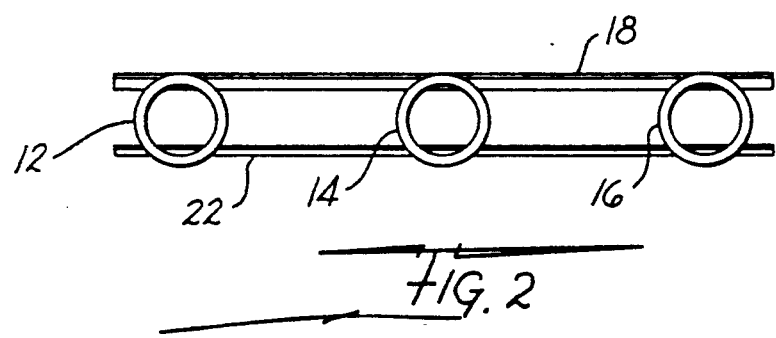
FIG. 2 is an end elevational view of the pallet illustrated in FIG. 1.
Figure 3:
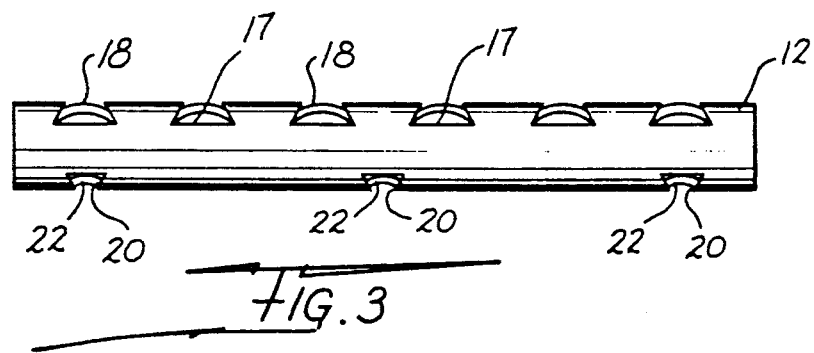
FIG. 3 is a side elevational view of the pallet illustrated in FIG. 1.

Referring now to the drawings, and particularly to FIGS. 1 through 3, a pallet generally designated at 10 constructed in accordance with the preferred form of the present invention comprises a plurality of longitudinally elongated runners 12, 14, 16, constructed from paperboard cores, preferably previously used cores which generally would be waste material headed to a landfill, but may alternatively be new cores wound by conventional equipment. These cores are readily available as hollow cylindrical members in varying lengths; generally five feet, eight feet and twelve feet lengths are the most available, and generally have a four inch, five inch or six inch outside diameter. Other sizes are available and all such cores may be utilized in the present invention. Cores of this type are typically used as a disposable mandrel about which paper, lingerboard, carpet or the like are wound in a roll and remain with the primary product until the roll is exhausted. They are most often not desirable for recycling at paperboard mills since in their original form they do not readily breakdown in a pulper. They are known as thick walled cores and have approximately one-half inch wall thickness. Other hollow core cross sectional configurations, e.g., square, rectangular and other configurations are also available but in substantially smaller quantities, and they too may be utilized in accordance with the present invention, so that the designation core includes all such configurations. The most readily available cores are of the four inch diameter size, and it is expected that most of the pallets will utilize runners of this size.

As best illustrated in FIG. 3, the runners include a plurality of notches 17 at longitudinally spaced locations extending transversely relative to the axis of elongation of the runners. Although the notches may be open ended or enclosed, it is preferred that the notches be open ended on the periphery of the runners for ease and economy of manufacture. Disposed within each notch 17 is an upper cross member 18 preferably formed from longitudinal segments of cores, as hereinafter described, the members 18 forming the deck of the pallet and being designated as deck members. The size, shape and depth of the notches 16, as hereinafter described, permit the upper surface of the deck members to be substantially flush with the upper surface of the runners to provide a flat deck. Additionally, the runners include a number of spaced apart transversely extending notches 20 at the lower surfaces for receiving a like number of lower cross members 22, designated as lower brace members, for providing rigidity to the structure, the lower brace members are also preferably formed from longitudinal segments of cores. The upper notches 17 and the lower notches 20 of the various runners 12, 14, 16 are disposed at substantially the same location so that the upper notches 17 of the respective runners may be aligned to receive the deck members 18 and the lower notches 20 may be aligned to receive the lower brace members 22 as illustrated. Although any number of runners, deck members and lower brace members may be utilized, it is expected that three such runners will typically be utilized with a sufficient number of deck and lower brace members to support the varying loads to be carried on the pallet. Typically, it is expected that three five foot long runners will be utilized with six or seven deck members and three lower brace members, the length of the brace members being five foot or smaller as desired.

The notches 17 and 18 may be of any convenient configuration permitting a tight and secure fit with the deck members 18 and the lower brace members 22 and, in the preferred embodiment, the notches 17 and 20 have a dovetail configuration, the wider portion of the notches being radially further into the body of the runner and narrowing toward the periphery. This arrangement permits the deck members and the lower brace members to be fitted and slidably positioned within the respective notches during assembly and held therein by friction without being released in the radial direction. Thus, adhesives, mechanical fasteners or the like are not required, although they may be used if desired, and a user of the pallet may readily adjust their size to smaller pallet sizes merely by adjusting the runners closer together and trimming the deck members and the lower brace members. Of course, the core lengths may also be shortened by trimming. Larger pallets may be created by a user by using longer length deck members and brace members with the runners spaced further apart or with the use of one or more additional runners. Furthermore, the pallets may be shipped in unassembled form and assembled by the user when required. This not only reduces the required space within the shipping vehicle, and thus the shipping costs, but also permits storage in a reduced space at the location of use and all distribution points therebetween.

Figure 4:
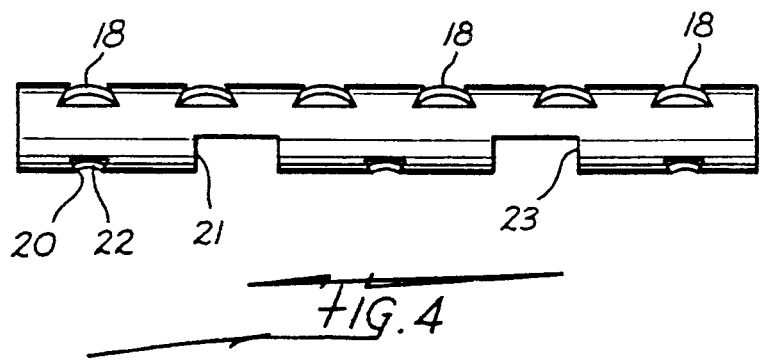
FIG. 4 is a view similar to FIG. 3, but illustrating a modification thereof for permitting four sided entry of material handling equipment for lifting the pallet.

The runners 12, 14, 16 are formed by first cutting the starting core material to length and thereafter cutting the notches 17 and 20 therein by a router blade, dado blades or a milling machine, or other conventional means for cutting dovetails. Additionally, as illustrated in FIG. 4, a pair of other notches 21, 23 of rectangular shape may be cut into the bottom periphery of the runners to permit entry of the tines or prongs of a fork lift or other material handling device beneath the pallet from the direction parallel to the direction of elongation of the deck members and lower brace members. In the direction of elongation of the runners, the material handling device may enter between the deck members and the lower brace members to lift the pallet by the deck members. Thus, entry from all four directions may be obtained.

Figure 5:
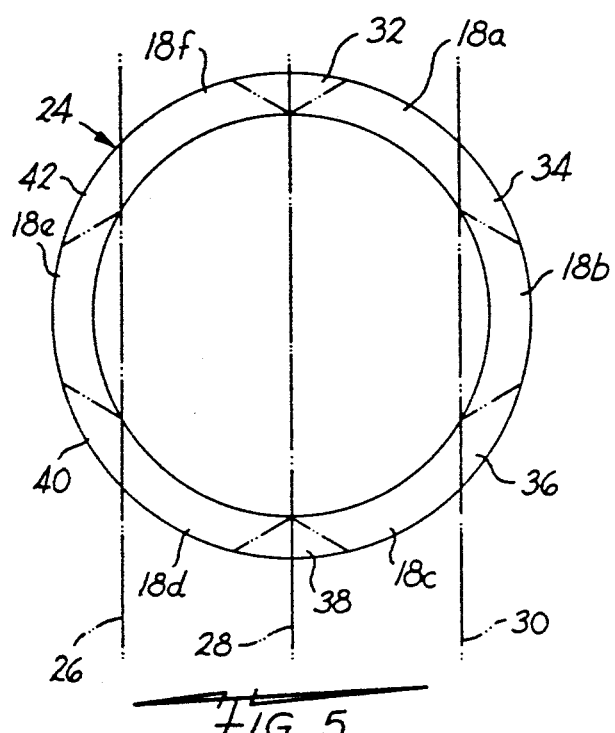
FIG. 5 is a diagrammatic end elevational view illustrating the manner in which a paperboard core may be sectioned to provide deck and lower brace members for the pallet illustrated in FIG. 1.

The deck members 18 and the lower brace members 22, as aforesaid, preferably are formed from segments of other cores. To provide a tight fit the edges of the segments are formed at an angle with the concave surface longer than the convex surface. For example, a six inch diameter cylindrical core 24, as illustrated in FIG. 5, may be sectioned longitudinally by cutting into six deck member segments 18a, 18b, 18c, 18d, 18e, 18f. Although, not illustrated, a four diameter core may yield four such members. If it is desired that the lower brace members 22 be the same width as the deck members, the yield will be the same as for the deck members. However, the lower brace members may be of a smaller size since they are not load supporting, so that greater yields are possible with the same starting core material. The procedure for forming the deck members from the core illustrated in FIG. 5 is to first cut the cores lengthwise along spaced parallel planes 26, 28, 30 and thereafter cut the waste portions 32, 34, 36, 38, 40, 42 to shape the members. For example, cutting along the planes 26, 28, 30 yields four pieces 18a, 18c, 18d, and 18f having waste material at one edge, e.g., one-half of the waste portions 32 and 38, and yield two pieces 18b, 18e with waste material at both edges, e.g., waste portions 34, 36 and 40, 42 respectively.

Figure 6:
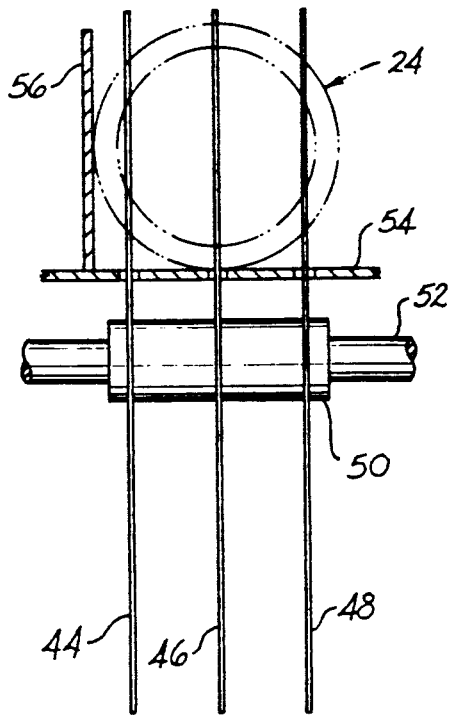
FIG. 6 is a diagrammatic view illustrating a first step in the preferred method of forming the deck and lower brace members from board core.
Figure 7:
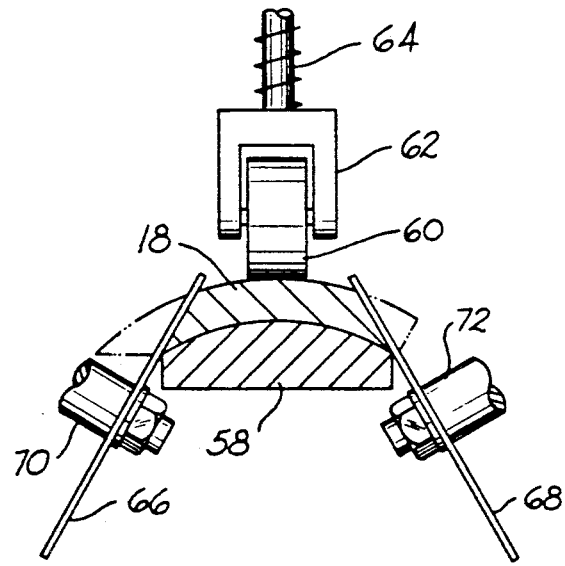
FIG. 7 illustrates a diagrammatic view illustrating a second step in the method of forming the deck and lower brace members.

The first cutting step may be made to simultaneously cut along the three planes 26, 28, 30 by apparatus as illustrated in FIG. 6. Thus, a triple blade saw comprising three thin kerf cutting saw blades 44, 46, 48 may be mounted on an arbor 50 or the like and disposed along the three planes, the arbor being mounted on a rotatably driven shaft 52. The core 24 is disposed on a table 54 and fed into the saw blades guided along a fence 56 or the like. The six pieces resulting from this step may then be shaped with apparatus as illustrated in FIG. 7 wherein the two pieces 18b, 18e are shaped by cutting the waste material from both edges, and the four pieces 18a, 18c, 18d, 18f are shaped by cutting the waste material from the two edges. For example, as illustrated in FIG. 7, the pieces formed by the first cut may be disposed on a backing guide block 58 and firmly pressed down thereon by an upper guide assembly including a roller 60 carried by a yolk 62 against which downward pressure is applied by pressure applying means such as a spring, plunger or the like 64. The piece is then fed into either a pair of spaced apart circular saw blades 66, 68 mounted on respective rotatably driven arbors 70, 72 mounted at the appropriate angle to form the edges with the concave surface larger than the convex surface. A router having a router blade for forming the edges may be utilized instead of the saw blades, as can any other conventional cutting means for forming the angularly disposed edges of the deck members 18. In the case of the two pieces 18b and 18e both edges are cut by the blades 66, 68, while in the case of the pieces 18a, 18c, 18d, and 18f one edge may be cut by one blade with the other surface merely guided against the other blade or a guide member substituted therefor.

Once the deck members 18 and the lower brace members 22 are formed they may be positioned within the respective notches 16, 20 merely by sliding them into the notches of the cores in seriatim when desired. The deck members are positioned with the longer concave surfaces facing the longer edges of the dovetail notches 16, i.e., inwardly relative to the cores 12, 14, 16, while the lower brace members 22 preferably are inserted into the notches 20 with the concave surfaces facing the shorter open end of the notches 20 so as to form a channel for readily receiving conventional banding strap used for securing a load to the pallet so that the strap may abut and extend along the concave surfaces. Of course, the banding straps that extend 90° to the notches 20 will pass through the hollow of the runners 12, 14, 16. Additionally, it is preferred that the convex surfaces of the deck members 18 be coplanar with the upper edge of the runners, as illustrated in FIG. 2, so that the top of the pallet is flat and coplanar for the strongest load supporting deck surface.

Figure 8:
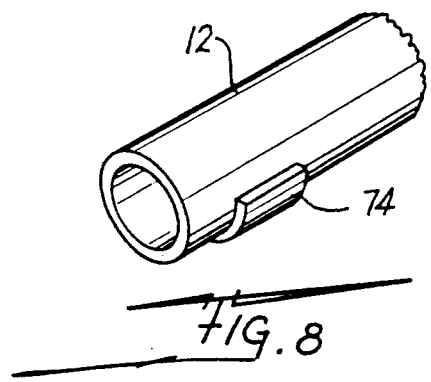
FIG. 8 is a fragmentary perspective view of a runner of the pulley in FIG. 1 including a moisture protection sleeve.
Figure 9:
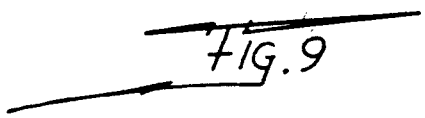
FIG. 9 is an end elevational view of the runner and sleeve illustrated in FIG. 8.

Although paperboard cores generally are relatively moisture resistant and do not wick readily, it may be desirable to protect the bottom of the runners from damage when standing on moist or wet ground. To this end, as illustrated in FIGS. 8 and 9 protection devices 74 formed from sections of cores may be disposed at various locations along each runner such as the runner 12. The protection device may be a semi-circular section cut from a six inch core and disposed about the lower periphery of runners formed from four inch cores and secured thereto by various means including adhesives. If the protection device is formed from a five inch core it may be friction fitted to the exterior of four inch runners. Additionally these protective members may be treated with a plastic material or other means to resist moisture from leaching to the runners.

A pallet constructed as aforesaid not only has the advantages of the utilization of material which would typically create disposal problems and overcomes the recycling difficulties, but themselves may be recycled or reused. As aforesaid, when certain of the elements have outlived their usefulness, others may be substituted by disassembling the spent elements and substituting new elements therefor. Additionally, after cores have been cut into segments for use as the deck members and the lower braces members, and after the cores have been notched to form the runners, they will more readily breakdown in a paperboard mill pulper. Accordingly, even spent elements of pallets constructed in accordance with the present invention will not create the landfill or incineration disposal needs of cores that are utilized as the raw material for the present invention.

In keeping within the principles of the present invention, the deck members 18, rather than the runners may be notched to receive the upper peripheral portion of the runners, which would not then be notched. In that case an adhesive would be utilized to secure the deck members to the runners. The brace members 20 may also be attached at peripheral surfaces to the runners with adhesives.

Thus, it may be readily seen that the present invention provides rigid load supporting pallets constructed substantially from spent paperboard materials which had been used previously for other purposes and would ordinarily create waste disposal problems. Accordingly, the present invention not only provides a solution to a portion of the ecology problem, but does so in a manner wherein a useful product is provided at economical cost.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A pallet comprising a load supporting deck and a plurality of spaced apart longitudinally elongated runners, said runners being formed from substantially identical cross section thick walled hollow paperboard cylindrical cores having an outside diameter of at least 4 inches and a wall thickness of at least 0.3 inch, each core including a plurality of longitudinally spaced apart substantially identically configured notches extending transversely therethrough and opening outwardly onto a longitudinal top peripheral surface of the respective runner, each of said notches having a pair of longitudinally spaced apart linear side edges, each side edge including at least a portion inclined from said top peripheral surface in diverging manner relative to the other edge of the pair, each of said notches further including a linear edge extending longitudinally and spaced intermediate said top peripheral surface and the axis of the respective cylindrical core runners, said runners being disposed so that the notches of each runner are aligned vertically and longitudinally with corresponding notches in other runners, said deck including a plurality of transversely extending spaced apart deck members, each of said deck members being a longitudinally extending arcuate segment of a thick walled hollow paperboard cylindrical core having an outside diameter of at least 4 inches and a wall thickness of at least 0.3 inch, each segment having a pair of longitudinally extending edges, a convex surface and a concave surface, and each segment being slidably received and positioned within respective aligned notches of the runners with said longitudinally extending edges in tight frictional engagement with portions of said linear side edges, with said concave surface disposed entirely within the respective notches, and with said convex surface disposed in the respective notches and having a central portion in substantially the same plane as the top peripheral surfaces of said runners, whereby said deck members are tightly and securely held within respective notches only by frictional engagement with the side edges of said notches.

2. A pallet as recited in claim 7, including a second plurality of longitudinally spaced apart notches extending transversely through each runner adjacent a longitudinal bottom surface of each runner, said second notches of each runner being aligned with second notches of the other runners, a brace member disposed within corresponding aligned second notches of said runners, each of said brace members being a longitudinally extending arcuate segment of a hollow paperboard core slidably positioned within respective aligned second notches, and said second notches having a cross sectional configuration permitting removal of said brace members from said runners transversely but resisting removal thereof in all other directions.

3. A pallet as recited in claim 2, wherein each of said second notches opens outwardly of said longitudinal bottom surface.

4. A pallet as recited in claim 3, wherein each of said second notches comprises a dovetail configuration narrowing toward said bottom surface.

5. A pallet as recited in claim 2, wherein each of said arcuate brace members has a convex surface and a concave surface, said brace members being positioned within said second notches with the concave surfaces directed toward said bottom surface and said convex surface directed toward the interior of said runner.

6. A pallet as recited in claim 2, including a third plurality of spaced apart notches extending transversely through each runner and opening at said bottom surface, said third plurality of notches of each runner being aligned with third notches of the other runners for receiving fork elements of material handling apparatus.

7. A pallet as recited in claim 5, including arcuate protection members disposed at said bottom surface and adjacent portions of said runners at selected locations.

8. A method of forming a pallet from thick walled cylindrical paperboard cores having an outside diameter of at least 4 inches and a wall thickness of at least 0.3 inches, said pallet comprising a plurality of longitudinally elongated runners connected together into a grid-like structure by a plurality of deck members, said method comprising:
(a) cutting certain of said cores to a desired length to form runner stock,
(b) cutting a plurality of notches transversely into the periphery of said runner stock at longitudinally spaced apart locations with each of said notches having oppositely facing longitudinally spaced apart edges connected together by a longitudinally extending edge and opening outwardly of the periphery of said stock,
(c) longitudinally sectioning other of said cores to form a plurality of laterally arcuate longitudinally extending side segments each having a pair of longitudinally extending side edges, a convex surface and a concave surface, said segments having a width between respective side edges and a cross sectional configuration to form deck members transversely receivable within each of said notches with a portion of said convex surfaces co-planar with said periphery when said concave surfaces are entirely within the same notch, (d) aligning said runner stock so that the notches in each runner are aligned longitudinally with corresponding notches of the other runners, and
(e) slidably positioning said deck members longitudinally into corresponding aligned notches of said runners with the concave surface, the convex surface and the side edges of each deck member within respective aligned notches and with said convex surfaces facing outwardly of said notches, and with the side edges of said deck members in tight frictional engagement with respective spaced apart edges of said notches, whereby said deck members are tightly and securely held only by friction within said notches.

9. The method as recited in claim 8, wherein said notches are formed with spaced apart transversely extending inclined side edges converging toward and having the narrowest spacing at said periphery.

* * * * *